United States Patent [19]

Gowda

[11] Patent Number: 5,340,203

[45] Date of Patent: Aug. 23, 1994

[54] VARIABLE LOAD CONTROL VALVE WITH DUAL DIAPHRAGMS REINFORCED BY WASHERS AND SPACER MEMBERS

[75] Inventor: Padmanab L. Gowda, Greer, S.C.

[73] Assignee: Westinghouse Air Brake Company, Wilmerding, Pa.

[21] Appl. No.: 74,526

[22] Filed: Jun. 11, 1993

[51] Int. Cl.$^5$ .................... B60T 8/18; B60T 15/02
[52] U.S. Cl. .................... 303/22.5; 303/22.8; 303/40
[58] Field of Search ............ 303/22.5–22.8, 303/40, 68, 9.69; 188/195

[56] References Cited

U.S. PATENT DOCUMENTS

| | | | |
|---|---|---|---|
| 2,062,500 | 12/1936 | Casler et al. | 303/40 X |
| 3,285,674 | 11/1966 | Eaton | 303/22.8 X |
| 3,460,872 | 8/1969 | Reno et al. | 303/22.6 |
| 3,504,698 | 4/1970 | Frill | 303/22.5 |
| 3,517,971 | 6/1970 | Scott | 303/22.5 |
| 3,583,772 | 6/1971 | Reno | 303/22.5 |
| 4,453,779 | 6/1984 | Bridigum | 303/22.5 |

*Primary Examiner*—Mark T. Le
*Assistant Examiner*—Josie A. Ballato
*Attorney, Agent, or Firm*—John B. Sotak

[57] ABSTRACT

A diaphragm-type of variable load control valve device having a diaphragm piston assembly for effectively providing pressurized fluid to the brake cylinders of a railway vehicle in accordance with the brake demand established by a vehicle operator and at a pressure level in conformance with the load condition of the vehicle.

15 Claims, 1 Drawing Sheet

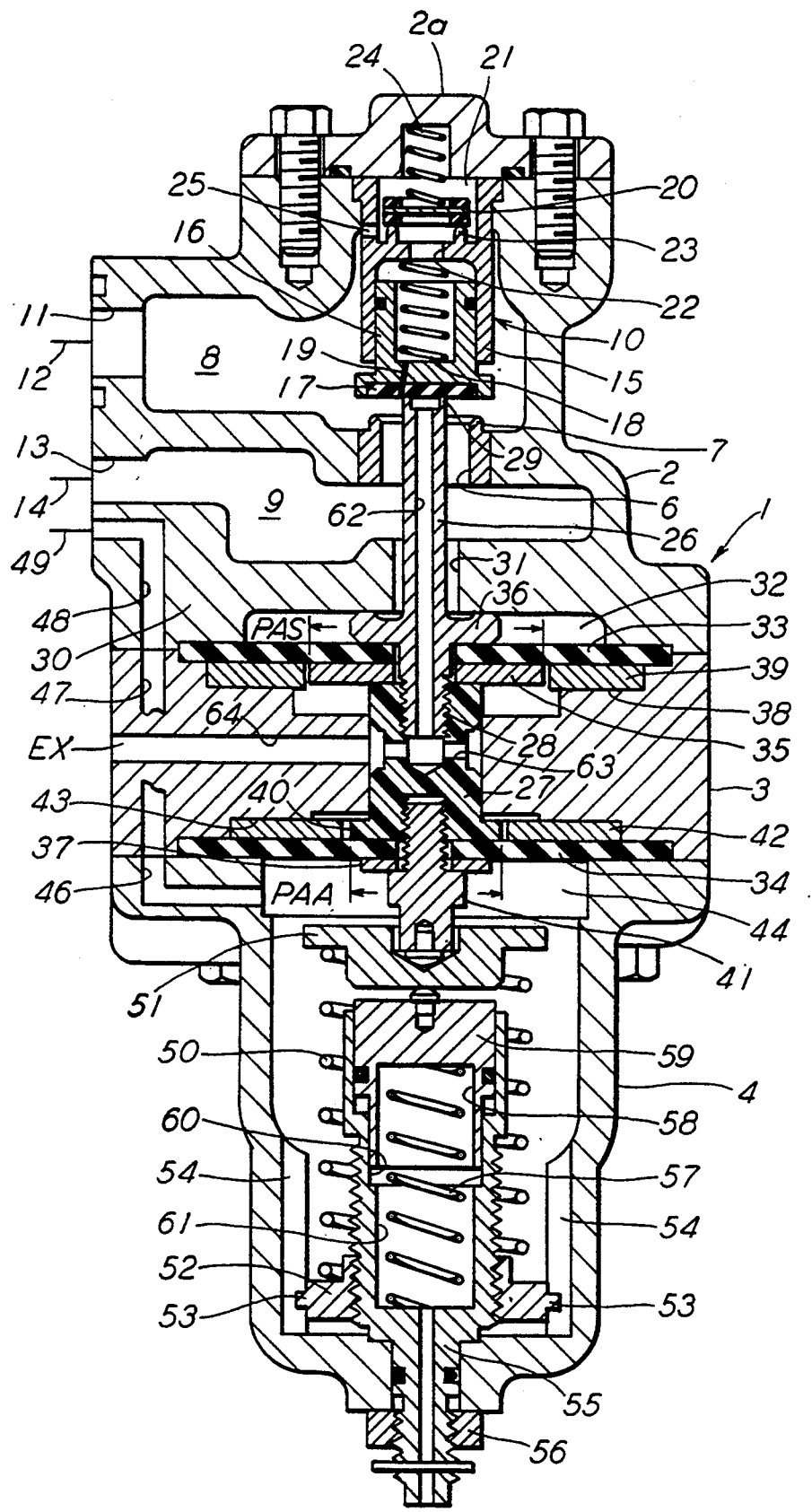

VARIABLE LOAD CONTROL VALVE WITH DUAL DIAPHRAGMS REINFORCED BY WASHERS AND SPACER MEMBERS

FIELD OF THE INVENTION

This invention relates to a changeable variable load control valve and more particularly to a diaphragm-type of variable load control valve device which functions to limit maximum value of air pressure that is directed to the brake cylinders in proportion to the ratio of the air spring pressure and brake cylinder pressure in a railway vehicle.

BACKGROUND OF THE INVENTION

It is well known to those skilled in the art that overbraking and ensuing wheel lockup and wheel sliding on lightly loaded rapid and/or mass transit vehicles must be avoided since flat spots and damage to the wheels may occur during the braking of passenger trains. On heavily loaded railway vehicles there is the possibility that underbraking conditions may result in longer braking distances which may cause a railway train to overrun its normal stopping point at a station or a block section. In order to avoid an overbraking and underbraking condition, it is common practice to employ a standard variable load control valve device such as shown and disclosed in U.S. Pat. Nos. 3,460,872; 3,504,698; 3,517,971; 3,583,772, and 4,453,779. However, these previous variable load control valves which are used in existing brake equipment generally consist of a stepped or graduated piston to obtain brake cylinder pressure in proportion to the air spring pressure which corresponds to the load on the railway vehicle. The piston member includes dynamic 0-ring seals that move within a cylindrical bushing which is properly dimensioned to prevent air leakage between the air spring pressure chamber and brake cylinder pressure chamber. However, it has been found that the break-away friction characteristics associated with the dynamic 0-ring seals can cause a relatively large variation in the output pressure particularly when the valve has been idle or unoperated for a long period of time, such as, an overnight layover. Even though the 0-rings are thoroughly lubricated during the initial assembly of the valve, the lubricant is eventually dissipated or dispersed during the subsequent operation of the valve so that the amount of static friction is dramatically increased. Further, it will be appreciated that the brake cutoff pressure is a function of the ratio of the effective pressures that are supplied to the upper and lower surface areas of the graduated piston of the variable load control valve. Since various transit properties have different brake and load characteristics, it is necessary to provide a multitude of different pressure ratios between the air spring pressure and the brake cylinder pressure. However, in any given stepped piston type of variable load control valve, the pressure ratio is fixed and can only be varied or changed by substituting a different size of graduated piston, O-rings and bushings and, in some cases, a different intermediate filling member or casing to accommodate the different-size bushings. Thus, it will be appreciated that a relatively large number of different parts must be kept in inventory to ensure that the variable load valve devices are capable of being adapted to fill the braking requirements of the various transit authorities. Further, it will be noted that the close manufacturing and machining tolerances required by the different stepped pistons and the cooperatively associated bushings are expensive to machine and manufacture.

SUMMARY AND OBJECTS OF THIS INVENTION

Accordingly, it is an object of this invention to provide a new and improved variable load valve device.

Another object of this invention is to provide novel diaphragm-type of variable load control valve for railway vehicles.

A further object of this invention is to provide a unique variable load control valve device employing a pair of diaphragm members for establishing a maximum pressure value which is a function of the ratio of the effective air spring pressure area and of the effective brake cylinder pressure area.

Still another object of this invention is to provide a novel diaphragm-type of variable load control valve wherein the ratio of the pressure area on a first diaphragm and a second diaphragm may be modified by varying the diameters of a washer member and a central opening of a spacer member.

Still a further object of this invention is to provide a diaphragm-type of a variable load control valve device comprising, an upper casing section, an intermediate casing section, and a lower casing section, a supply chamber and a delivery chamber located within the upper casing section, a release and check valve located within the supply chamber, a piston diaphragm assembly disposed in the intermediate casing section, the piston diaphragm assembly including an upper flexible diaphragm having its inner periphery clamped between one washer member and a piston stem which is connected to a piston member and having its outer periphery clamped between the upper casing section and the intermediate casing section, the piston diaphragm assembly including a lower flexible diaphragm having its inner periphery clamped between another washer and a shoulder portion of the piston member and having its outer periphery clamped between the intermediate casing section and the lower casing section, a delivery control chamber located between the underside of the upper casing section and the upper side of the upper flexible diaphragm, a load control chamber located in the lower casing chamber below said lower flexible diaphragm whereby fluid under pressure is conveyed from the supply chamber to the delivery chamber, and fluid under pressure in the delivery chamber is limited to a maximum value in accordance with the pressure in the load control chamber.

Yet another object of this invention is to provide an improved diaphragm-type of variable load control valve which is economical in cost, simple in design, efficient in service, effective in operation, reliable in use, durable in service, convenient to install, and practical to maintain.

DESCRIPTION OF THE DRAWING

The above objects and other attendant features and advantages will be more readily appreciated as the present invention becomes better understood by reference to the following detailed description when considered in conjunction with the accompanying drawing in which the single Figure is a schematic elevational view, mostly in section, of a diaphragm-type of valve load control valve device embodying the present invention.

DETAILED DESCRIPTION OF THE INVENTION

Referring to the single Figure of the drawing, there is shown a variable load valve 1 which may be used in the braking system of a railway vehicle. The variable load control valve device 1 includes three housing portions, namely, an upper casing section 2, an intermediate casing section 3, and a lower casing section 4.

It will be seen that a supply chamber 8 and a delivery chamber 9 are formed in the upper housing portion 2. A check or cut-off and release valve assembly 10 is physically disposed within the upper casing section 2 for controlling fluid communication between the supply chamber 8 and the delivery chamber 9 via passageway 6 having an annular valve seat 7 surrounding the end opening into the supply chamber 8. The supply chamber 8 is connected to a suitable source of air pressure, such as, a vehicle storage reservoir (not shown) via port 11 and pipe 12, while the delivery chamber 9 is connected to vehicular brake cylinders (not shown) via port 13 and pipe 14. The valve assemblage 10 includes a bushing member 15 disposed in the top portion of the upper casing section 2 in which a valve carrying member 16 is coaxially slidably mounted therein. The valve carrying member 16 includes a spring biased annular check valve 17 located in the lower end. A relatively light spring 18 normally urges the valve carrying member 16 downwardly toward a closed position in which the check valve 17 occupies a seated position on valve seat 7 to cut off communication through the passageway 6. A through port 19 is formed in the valve member 17 and in the bottom of the carrying member 16 to provide a balance state of fluid pressure between both sides of the check valve. A release valve 20 is operably located in a release valve chamber 21 located above the check valve 17. The release valve 20 is provided in order that the unseating of the check valve 17 may be effected when the fluid pressure in the supply chamber 8 is either reduced or released for nullifying an existing brake application condition. When the check valve 17 is in its seated position on the valve seat 7, a balance state exists since the delivery pressure acts on both sides thereof, and any valve change of the supply pressure, particularly a pressure reduction in the supply chamber 8 would be ineffective on the check valve 17 unless some means is provided for relieving the upper side of the check valve of the delivery pressure acting thereon so that the pressure acting on the underside thereof is rendered effective for unseating the check valve 17.

As shown, the upper end of the bushing member 15 is provided with an opening 22 which is surrounded by a valve seat 23. The release valve 20 is urged toward a seated or retaining position on the valve seat 23 by a helical compression spring 24 and the supply pressure acting on the upper side thereof. The top portion of the biasing spring 24 is disposed within a central opening formed in protective cover member 2a which is suitably bolted to the top end of the upper casing section 2. As viewed in the drawing, the underside of the release valve 20 is in communication with and is subject by way of opening 22 to delivery fluid pressure acting on the upper side of the check valve 17. The upper side of the release valve is in communication with and is subject to supply fluid pressure in chamber 8 by way of a port 25 which connects the supply chamber 8 to the peripheral space of the release valve chamber 21 in which the release valve 20 is loosely disposed. Thus, as long as the combined forces of the supply fluid pressure and the spring 24 acting on the upper side of the release valve 20 are greater than that of the delivery fluid pressure acting on the underside thereof, the release valve 20 will be held in its seated position on the valve seat 23. Now when the supply air pressure in chamber 8 is reduced or released due to the initiation of a brake reduction, the delivery pressure in chamber 9 acting on the underside of the release valve 20 will overcome the forces on the upper side of the release valve 20 so that the release valve 20 becomes opened by being unseated from the valve seat 23. Thus, the check valve 17 also becomes unseated by the higher pressure acting on the underside thereof to thereby cause a reduction of the delivery fluid pressure in proportion to the reduction in the supply fluid pressure.

As shown in the single Figure of the drawing, a hollow piston stem or plunger 26 extends coaxially from a piston member 27 while the upper end 29 of the piston stem or plunger 26 makes abutting contact with the underside of the check valve member 17 to normally maintain the check valve in its unseated position from seat 7 so that a communication fluid path through passageway 6 is normally opened. It will be seen that the piston stem 26 passes through opening 6 and also through opening 31 formed in the lower wall 30 of the upper casing section 2 and into delivery control chamber 32. It will be observed that the piston member 27 which is constructed of a self-lubrication polymer material is suspended and disposed within the intermediate casing section 3 by a pair of flat annular rubber diaphragms 33 and 34. The inner peripheral portion of the upper resilient diaphragm 33 is clamped between the top of an inner annular washer 35 and an annular collar 36 which is integral with the piston stem 26. In practice, the lower end 28 of the piston stem 26 is screw threaded into the top of the movable piston member 27. It will be noted that outer peripheral portion of the flat resilient diaphragm 33 is clamped between the upper and intermediate casing sections 2 and 3. As shown in the single Figure of the drawing, an outer annular spacer member 39 is disposed between the underside of the top diaphragm 33 and a recessed portion 38 formed in the top of the intermediate casing section 3. As shown, the inner peripheral portion of the lower resilient diaphragm 34 is clamped between the top of an annular washer 37 and the bottom of an enlarged shoulder portion 40 by a lower piston stem 41 which is screw threaded into the bottom of the reciprocable piston 27. It will be seen that an outer annular spacer member 42 is disposed between top side of the lower resilient diaphragm 34 and a recessed portion 43 formed in the bottom of the intermediate casing section 3.

A lower pressure area is subject to a load control pressure in a spring chamber 44 formed in the lower casing section 4. The chamber 44 is charged with the air spring pressure via passageways 46, 47, and 48 formed in the lower, intermediate and upper casing sections 4, 3, and 2, respectively. The passageway 48 is connected to the air springs (not shown) via a pipe 49. The level or degree of control pressure or air spring pressure in the spring chamber 44 is dependent upon and reflects the existing load condition of the railway vehicle. Thus, the amount of air pressure in chamber 44 is a function of the load carried by a vehicle which is calibrated from an empty to a fully loaded condition. A first helical compression or biasing spring 50 is disposed in the air spring chamber 44 and urges the diaphragm piston 27 upwardly toward an open supply position as will be described hereinafter. The biasing spring 50 is compressed between an upper spring seat 51 and a lower spring seat 52. The upper spring seat 51 rests against the lower end of the piston stem 41, and the lower spring seat 52 is fixed against rotational movement by a pair of diametrically opposed tabs 53 and ribs 54. Thus, the axial position of the lower spring rest 52 may be moved up or down by adjusting screw 55 which is screwed into a threaded bore in the spring seat 52. Hence, the height of spring 50 may be adjusted for varying the compressive force, and after being suitably adjusted, the adjusting screw 55 may be locked against inadvertent rotation by lock nut 56. An auxiliary or second compression spring 57 is caged in a recess 58 formed coaxially in an auxiliary piston 59 which is reciprocally disposed in a bore 60 formed in adjusting screw 55 and recess 61 formed in screw member 55.

In describing the operation of the present variable load control valve device 1, it will be assumed that the supply reservoir is charged with a fluid pressure at a normal operating value and that the spring air chamber 44 is being supplied with a pressure which is representative of the existing vehicular load. Thus, it will be appreciated that until such time as the engineer initiates a brake application, the supply chamber 8 and the delivery chamber 9 and the control pressure chamber 32 are void of fluid pressure so that the piston 27 and diaphragms 33 and 34 are effectively under the influence of the compression spring 50 and the air spring pressure in control chamber 44 to assume a normal or supply position as shown and in which the check valve 17 is in its unseated position and the release valve 20 is in its seated position.

Now when the engineer or trainman initiates a service brake application, the associated control devices cause operating fluid pressure, the level of which is dependent upon the degree of brake application requested by the operator, to be supplied to the supply chamber 8 via pipe 12 and port 11. The supply pressure then flows through the open check valve 17 through passageway 6 to the delivery chamber 9. The fluid pressure in the delivery chamber 9, in turn, flows through port 13 and pipe 14 to the brake cylinders for instituting a brake application on the railway vehicle. At the same time, fluid pressure in the delivery chamber 9 flows through the intervening passageway 31 in wall 30 and into the chamber 32 and acts on the pressure area PAS which is effectively and primarily determined by the bore diameter of the spacer 39. It will be also seen that the fluid pressure in air spring chamber 44 acts on the pressure area PAA which is effectively and primarily determined by the bore diameter of spacer 42. In viewing the single Figure of the drawing, it will be seen that the pressure area PAS is somewhat greater than the pressure area PAA. In the present instance, the ratio of the two surface areas may be, for example, approximately 2:1. As will be described hereinafter, the pressure area ratio may be varied or changed as the situation warrants for various brake applications on different types of vehicles. For example, if the degree of brake application by the train operator is of such a low level that the pressure of the operating fluid acting on the pressure area PAS is insufficient for overcoming the opposing forces of the biasing spring 50 and the air spring pressure in the chamber 44 acting on the pressure area PAA, then the positions of the respective diaphragms 33, 34, washer 35, piston 27, and piston stem 25, as well as the check valve 17, will remain unchanged.

However, if the operator now either initiates a new service brake application or effects an increase of the existing low level service brake application to the extent that the degree of operating air pressure now active on the pressure area PAS is sufficient to overcome the opposing forces acting on the pressure area PAA, then the diaphragms: 33, 34, washer 35, piston 27, and piston stem 25, as well as the check valve 17, are moved downwardly out of the normal position to a closed or non-supply position. Under this condition, the biasing spring 18 moves the check valve 17 downwardly against the seat 7 to cause the check valve 7 to assume its closed or cut-off position. Thus, the flow of operating fluid under pressure to the delivery chamber 9 and to the brake cylinders is cut off at the given level determined by the compression setting of the spring 50 and the degree of air spring pressure in the chamber 44, even though the operator may attempt to further increase the brake application by effecting an additional increase of fluid pressure in the supply chamber 8. Once the check valve 17 is seated, the forces on both sides of the diaphragms 33 and 34 are balanced and the check valve 17 is retained in its retained position until such time that the-supply pressure in chamber 21 acting on the upper side of the release valve 20 is exhausted or vented to atmosphere. Now when the operator effects a brake reduction or release of the brake application and the supply pressure is decreased sufficiently, the delivery pressure on the underside of the release valve 20 causes it to become unseated. Thus, the service brake operations, the maximum limit of the fluid pressure deliverable to the brake cylinders, namely, the pressure at which the cutoff occurs is determined by the existing load condition of the vehicle, that is the degree of air spring pressure in the air spring chamber 44. Accordingly, the force of the air spring pressure in chamber 44 plus the force of the compression spring 50 is the amount of force that must be overcome by the operating fluid pressure which is in the delivery chamber 9.

It will be appreciated that all brake applications whether service or emergency are released when the operator in an appropriate manner causes the actuation of a suitable control valve device to effect the release of the fluid pressure in the supply chamber 8. Thus, when a brake reduction is initiated by releasing the fluid pressure in the supply chamber 8, the upper side of the release valve 20 is relieved of the supply fluid pressure so that the fluid pressure on the under side thereof is effective in unseating the release valve 20 from seat 23. The delivery pressure acting on the upper side if the check valve 17 is permitted to escape past the unseated release valve 20 so that the delivery pressure now acting only on the under side of the check valve 17 causes it to become unseated. It will be seen that with the check valve 17 unseated, the fluid pressure acting on the pressure area 32 of the flat diaphragm 33 is relieved so that the various parts are returned to their normal position by the spring 50, and the air spring pressure in chamber 44 to completely unseat the check valve 17. Thus, the fluid pressure from the brake cylinders may readily flow through pipe 14, port 13, delivery chamber 9, through passageway 6, past the unseated check valve 17, through chamber 8, through port 11 to pipe 12 and to an atmospheric port in the control device (not shown).

It will be appreciated that, if an overshoot condition occurs, the air in the chamber 8 will flow into chamber 9 and chamber 32 located above the diaphragm 33. The force of the overshoot air pressure will move the piston and diaphragm assembly rapidly downwardly so that the piston stem 26 pulls away from the valve 17. Accordingly, air under pressure in the chamber 9 will then flow through the passageway 62 in the piston stem 26, passageway 63 in the piston 27, passageway 64 in the intermediate casing section, and will be vented to atmosphere at port EX until the overshoot condition is corrected.

As previously mentioned, the presently described variable load control device 1 is a differential type of pressure operating device in which the effective surface area FAS may be readily changed by simply removing and replacing the washer 35 and the spacer 39. In order to change the ratio of the pressure area PAS relative to the pressure area PAA, it is merely necessary to change out the upper washer and spacer members. To increase the pressure ratio, the outside diameter of the washer 35 and the inner diameter of the circular hole in the spacer 30 are increased. Conversely, to decrease the pressure ratio, the diameters of the washer 35 and the circular hole in the spacer 39 are decreased. Thus, the ratio of the pressure areas may be readily selected and/or changed to compensate for various supply and air spring pressures as well as for varying compressive forces of various springs.

The use of the two flat polyurethane diaphragms can simulate the function of a stepped piston of variable load control valve device and also alleviates the friction breakaway problems associated with dynamic O-rings. It will be noted that the diaphragm-type of variable load control valve permits the ratio between the air spring pressure and the brake cylinder pressure to be quickly and easily changed by interchanging two simple and inexpensive components. The use of a self-lubricating polymer piston member eliminates the need of extraneous lubricants.

Thus, the present invention has been described in such full, clear, concise and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

What I claim is:

1. A diaphragm-type of variable load control valve device comprising, an upper casing section, an intermediate casing section, and a lower casing section, a supply chamber and a delivery chamber located within said upper casing section, a release and check valve located within said supply chamber, a piston diaphragm assembly disposed in said intermediate casing section, said piston diaphragm assembly including an upper flexible diaphragm having its inner periphery clamped between one washer member and a piston stem which is connected to a piston member and having its outer periphery clamped between said upper casing section and said intermediate casing section, said piston diaphragm assembly including a lower flexible diaphragm having its inner periphery clamped between another washer and a shoulder portion of said piston member and having its outer periphery clamped between said intermediate casing section and said lower casing section, a delivery control chamber located between the under side of said upper casing section and the upper side of said upper flexible diaphragm, a load control chamber located in said lower casing chamber below said lower flexible diaphragm whereby fluid under pressure is conveyed from said supply chamber to said delivery chamber and fluid under pressure in said delivery chamber is limited to a maximum value in accordance with the pressure in said load control chamber.

2. The diaphragm-type of variable load control valve as defined in claim 1, wherein said piston member is constructed of a self-lubricating polymer material.

3. The diaphragm-type of variable load control valve as defined in claim 1, wherein a first annular spacer member is disposed in an annular recess formed in the top of said intermediate casing section.

4. The diaphragm-type of variable load control valve as defined in claim 3, wherein said first annular spacer member includes a central opening for accommodating said one washer member.

5. The diaphragm-type of variable load control valve as defined in claim 4, wherein the diameter of said one washer member is substantially equal to the diameter of said central opening of said first annular spacer member for establishing a first pressure area.

6. The diaphragm-type of variable load control valve as defined in claim 5, wherein said first pressure area is exposed to pressure supplied to said delivery control chamber when said check valve is open.

7. The diaphragm-type of variable load control valve as defined in claim 5, wherein said first pressure area may be varied by changing the diameters of said one washer member and said central opening of said first annular spacer member.

8. The diaphragm-type of variable load control valve as defined in claim 1, wherein a second annular spacer member is disposed in an annular recess formed in the bottom of said intermediate casing section.

9. The diaphragm-type of variable load control valve as defined in claim 8, wherein said second annular spacer member includes a central opening for accommodating said shoulder portion of said piston member.

10. The diaphragm-type of variable load control valve as defined in claim 9, wherein the diameter of said shoulder portion of said piston member is substantially equal to the diameter of said central opening of said second annular spacer member for establishing a second pressure area.

11. The diaphragm-type of variable load control valve as defined in claim 10, wherein said second pressure area is exposed to pressure supplied to said load control chamber.

12. The diaphragm-type of variable load control valve as defined in claim 1, wherein a compression biasing spring is disposed in said load control chamber.

13. The diaphragm-type of variable load control valve as defined in claim 1, wherein said piston stem is secured to said piston member and includes a remote end for engaging and unseating said check valve.

14. The diaphragm-type of variable load control valve as defined in claim 13, wherein said piston stem is a hollow member which is connectable to atmosphere to vent said delivery chamber.

15. The diaphragm-type of variable load control valve as defined in claim 1, wherein a release valve is unseated when the pressure in said supply chamber is reduced to permit the unseating of said check valve.

* * * * *